US008761818B2

(12) United States Patent
Dhanakshirur et al.

(10) Patent No.: US 8,761,818 B2
(45) Date of Patent: *Jun. 24, 2014

(54) CONVERGED DIALOG IN HYBRID MOBILE APPLICATIONS

(71) Applicant: International Business Machines Corporation, Armonk, NY (US)

(72) Inventors: Girish Dhanakshirur, Bangalore (IN); Alwyn R. Lobo, Bangalore (IN); Thejaswini Ramachandra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,558

(22) Filed: Feb. 18, 2013

(65) Prior Publication Data

US 2014/0128112 A1    May 8, 2014

Related U.S. Application Data

(63) Continuation of application No. 13/668,696, filed on Nov. 5, 2012.

(51) Int. Cl.
*H04W 4/00* (2009.01)
*H04L 29/06* (2006.01)

(52) U.S. Cl.
USPC ....................................... 455/466; 455/414.3

(58) Field of Classification Search
USPC ........ 455/466, 414.1, 414.2, 414.4; 705/7.27, 705/301
See application file for complete search history.

(56) References Cited

U.S. PATENT DOCUMENTS

| | | | |
|---|---|---|---|
| 7,962,485 B1 | 6/2011 | Trandal et al. | |
| 2005/0154741 A1 | 7/2005 | Hebert et al. | |
| 2006/0058048 A1* | 3/2006 | Kapoor et al. | 455/466 |
| 2007/0149225 A1* | 6/2007 | Chen et al. | 455/466 |
| 2007/0208587 A1* | 9/2007 | Sitaraman | 705/1 |
| 2007/0232333 A1 | 10/2007 | Xu | |
| 2008/0076453 A1* | 3/2008 | Cai et al. | 455/466 |
| 2009/0006116 A1* | 1/2009 | Baker et al. | 705/1 |
| 2009/0024404 A1* | 1/2009 | Morley et al. | 705/1 |
| 2009/0044185 A1 | 2/2009 | Krivopaltsev | |
| 2009/0119754 A1* | 5/2009 | Schubert | 726/4 |
| 2009/0137244 A1* | 5/2009 | Zhou et al. | 455/426.1 |
| 2009/0144194 A1* | 6/2009 | Dickelman | 705/39 |

(Continued)

OTHER PUBLICATIONS

Chiu et al.; Three-Tier View-Based Mobile Workflows; Proceedings of the 1st International Conference on M-Business; 2002 (10 pages).

(Continued)

*Primary Examiner* — Christopher M Brandt
(74) *Attorney, Agent, or Firm* — James L. Baudino

(57) ABSTRACT

According to one aspect of the present disclosure, a method and technique for converged dialog in hybrid mobile applications is disclosed. The method includes: responsive to receiving a short message service (SMS) request from an SMS device, determining a data policy corresponding to the request; initiating an SMS communication dialog with the SMS device to collect data corresponding to the data policy; determining whether the data policy indicates a need for a dialog with a hybrid device; and responsive to determining that the data policy indicates a need for a dialog with a hybrid device, initiating a non-SMS communication dialog with a hybrid device corresponding to the collected data.

13 Claims, 4 Drawing Sheets

(56) References Cited

U.S. PATENT DOCUMENTS

| | | |
|---|---|---|
| 2010/0197326 A1 | 8/2010 | Ngo |
| 2011/0106709 A1* | 5/2011 | Puura et al. ............... 705/64 |
| 2011/0161117 A1 | 6/2011 | Busque et al. |
| 2011/0178926 A1* | 7/2011 | Lindelsee et al. ............ 705/44 |
| 2011/0196742 A1 | 8/2011 | Holal et al. |
| 2011/0305331 A1* | 12/2011 | Hughes et al. ......... 379/202.01 |
| 2012/0066010 A1* | 3/2012 | Williams et al. ............. 705/4 |
| 2012/0322470 A1* | 12/2012 | Said et al. ............... 455/466 |

OTHER PUBLICATIONS

Fuglerud et al.; Workflow on Mobile Phones; ASK-IT International Conference; Jun. 2008 (12 pages).

How Notore's Retailers and Distributors Provide Real-Time Inventory Updates; Internet article; Aug. 6, 2011.

SMS-Based Monitoring System; ICT Facilitated Access to Information Innovation in South Asia (Case Study 5); Jul. 2011; pp. 95-109.

* cited by examiner

CONVERGED DIALOG IN HYBRID MOBILE APPLICATIONS

BACKGROUND

In today's business environments, computing is shifting towards mobile computing utilizing mobile handsets/devices. These mobile devices typically include web browsing capability as well as on-board applications that enable business and workflow transactions to be performed using the mobile devices. For example, the mobile devices may be used to fill out forms, perform purchasing transactions, update inventories, etc.

BRIEF SUMMARY

According to one aspect of the present disclosure a method and technique for converged dialog in hybrid mobile applications is disclosed. The method includes: responsive to receiving a short message service (SMS) request from an SMS device, determining a data policy corresponding to the request; initiating an SMS communication dialog with the SMS device to collect data corresponding to the data policy; determining whether the data policy indicates a need for a dialog with a hybrid device; and responsive to determining that the data policy indicates a need for a dialog with a hybrid device, initiating a non-SMS communication dialog with a hybrid device corresponding to the collected data.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
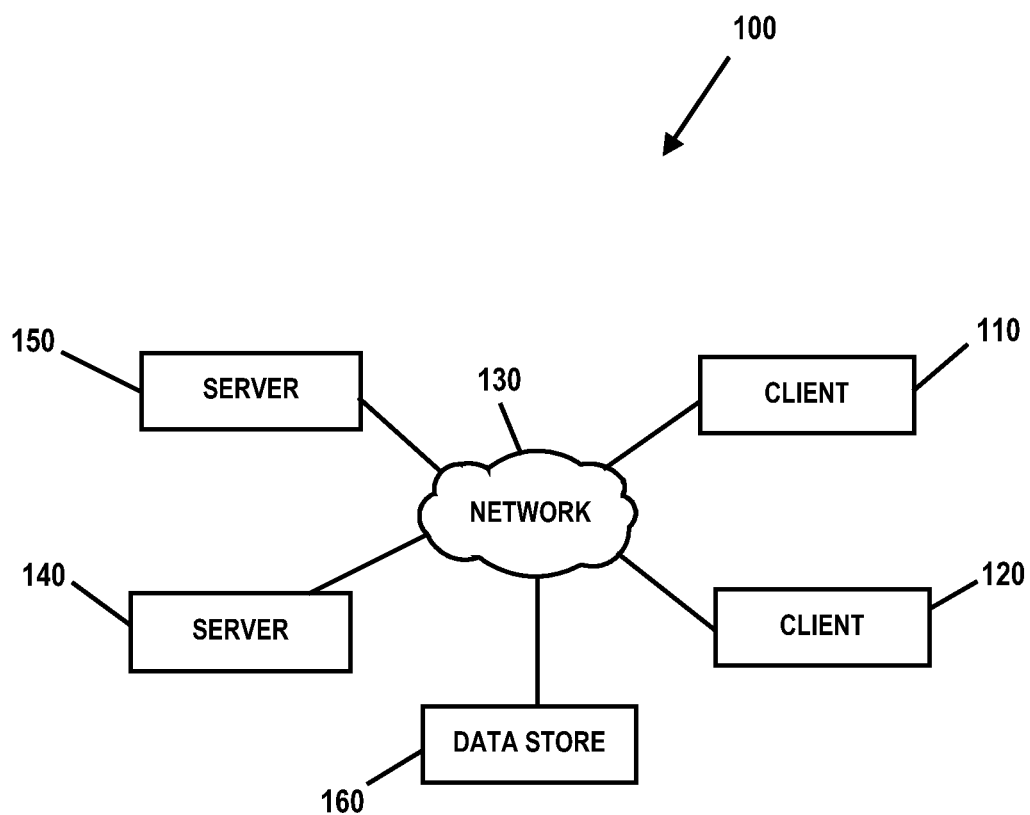
FIG. 1 is an embodiment of a network of data processing systems in which the illustrative embodiments of the present disclosure may be implemented.

Embodiments of the present disclosure provide a method, system and computer program product for converged dialog in hybrid mobile applications. For example, in some embodiments, the method and technique includes: responsive to receiving a short message service (SMS) request from an SMS device, determining a data policy corresponding to the request; initiating an SMS communication dialog with the SMS device to collect data corresponding to the data policy; determining whether the data policy indicates a need for a dialog with a hybrid device; and responsive to determining that the data policy indicates a need for a dialog with a hybrid device, initiating a non-SMS communication dialog with a hybrid device corresponding to the collected data. Thus, in some embodiments of the present disclosure, workflow data management and acquisition utilizes SMS messages from SMS-type or SMS-limited devices while also enabling the interaction of hybrid devices in the workflow process. Embodiments of the present disclosure enable the use of SMS messages to collect various types of information corresponding to a particular workflow application while also enabling the interaction of hybrid devices in such workflow application.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
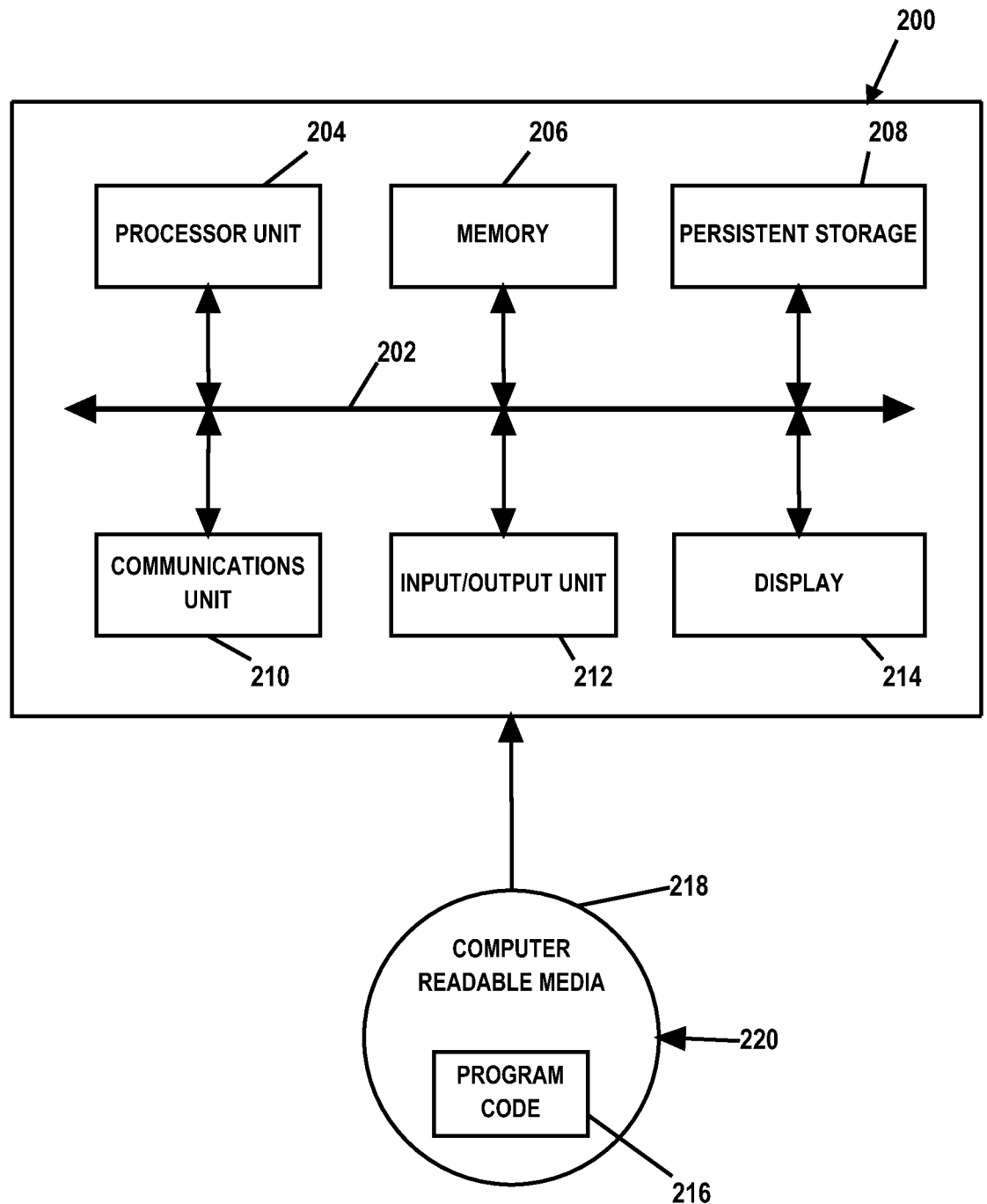
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for converged dialog in hybrid mobile applications according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
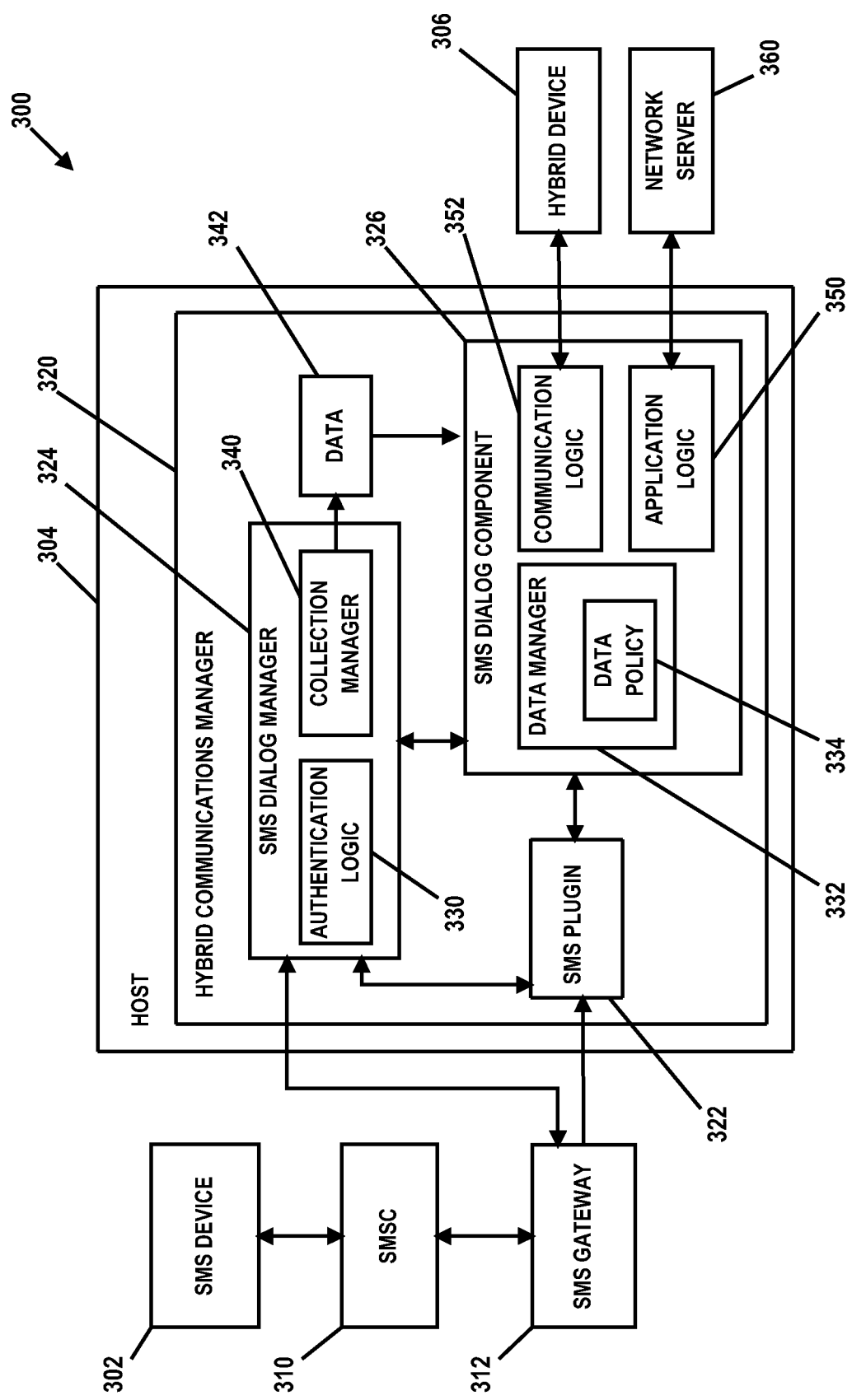
FIG. 3 is a diagram illustrating an embodiment of a data processing system for converged dialog in hybrid mobile applications in which illustrative embodiments of the present disclosure may be implemented.

FIG. 3 is an illustrative embodiment of a system 300 for converged dialog in hybrid mobile applications. System 300 may be implemented on data processing systems or platforms such as, but not limited to, servers 140 and/or 150, clients 110 and/or 120, or at other data processing system locations. For example, in the embodiment illustrated in FIG. 3, system 300 comprises a short message service (SMS) device 302, a host 304, and a hybrid device 306. Host 304 may comprise a server (e.g., servers 140 and/or 150) or other type of data processing platform accessible via a communication network supporting SMS communications as well as other type of communications and/or hosting services (e.g., application and/or web-based application hosting/processing). SMS device 302 comprises a mobile telephone or other type of device capable of sending/receiving SMS messages and/or notifications. Hybrid device 306 may comprise a mobile telephone, tablet computer or other type of device capable of non-SMS communications. For example, in some embodiments, hybrid device 306 may comprise a smartphone capable of communicating via SMS while also being equipped with Internet or web browsing capability, application hosting/processing, etc.

In the illustrated embodiment, system 300 includes a SMS center (SMSC) 310 and a SMS gateway 312. SMSC 310 may comprise a server or other type of data processing system/interface or telecommunications network element for receiving and/or delivering SMS messages. SMS gateway 312 may comprise a network facility for sending or receiving SMS messages to or from a telecommunications network. Thus, in the embodiment illustrated in FIG. 3, SMSC 310 receives/transmits SMS messages from/to SMS device 302 via SMS gateway 312. SMS gateway 312 interfaces with a hybrid communications manager 320 residing on host 304. Hybrid communications manager 320 may be implemented in any suitable manner using known techniques that may be hardware-based, software-based, or some combination of both. For example, hybrid communications manager 320 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). In the embodiment illustrated in FIG. 3, hybrid communications manager 320 includes a SMS plugin 322, a SMS dialog manager 324, and a SMS dialog component 326. SMS plugin 322 interfaces with SMS gateway 312 to receive requests from SMS device 302 for initiating and/or otherwise executing a workflow or other type of data processing application utilizing SMS messages.

SMS dialog manager 324 is configured to orchestrate and/or otherwise manage a SMS dialog exchange with SMS device 302 to collect various types of data corresponding to the requested service. For example, in response to receiving a request to invoke a particular service from host 304 by SMS device 302 via SMS plugin 322, SMS plugin 322 invokes SMS dialog manager 324. In some embodiments, SMS dialog manager 324 includes authentication logic 330 for authenticating an identity of a user of SMS device 302. For example, in some embodiments, SMS dialog manager 324 may initiate one of more SMS message exchanges with SMS device 302 requesting a password, identifier, and/or other type of authentication information to authenticate the identity of the user of SMS device 302 before providing the requested service. In response to authentication of the identity of the user of SMS device 302, SMS dialog manager 324 may further execute instructions for providing the requested service.

In some embodiments (e.g., in response to authentication of the identity of the user of SMS device 302), SMS dialog manager 324 interfaces with a data manager 332 of SMS dialog component 326 to obtain a data policy 334 corresponding to the requested service. For example, depending on the particular service requested by SMS device 302, data policy 334 may indicate the types of data/information needed from the user of the SMS device 302, the data processing requirements for the collected data (e.g., whether approval is needed from a third party, whether the collected data requires processing before being transmitted to a third party or network host, etc.), the format for the collected data (e.g., certain data components to be included in certain fields of an xml file), or other types of requirements relating to the particular service. A collection manager 340 of SMS dialog manager 324 then initiates a SMS communications dialog with SMS device 302 to collect certain data based on the service and the particular data policy 334. For example, if the requested service is for an inventory update, data policy 334 may indicate that certain types of information are needed corresponding to each product of the inventory. Collection manager 340 generates one of more SMS messages and transmits the series of SMS messages to SMS device 302 to collect the needed data as defined by data policy 334. Each SMS response message received from SMS device 302 may include data 342 that collection manager 340 uses to update the inventory data (e.g., filling in various fields of an xml form or other type of data collection format).

SMS dialog manager 324 interfaces with SMS dialog component 326 and provides the collected data 342 to SMS dialog component 326. In the illustrated embodiment, SMS dialog component 326 includes application logic 350 and communication logic 352. Application logic 350 may comprise code, instructions and/or other processing functions for processing the collected data 342 and/or making the collected data 342 available to third parties (e.g., launching/updating a web-based application on host 304 for enabling access to the collected data 342 via a web browser of other means, processing and/or transmitting the collected data to a network server 360 for further processing and/or access, etc.). In some embodiments, communication logic 352 may be used to initiate a non-SMS communication dialog with hybrid device 306. For example, in some embodiments, communication logic 352 may generate and transmit an email communication to hybrid device 306 containing data 342 and/or requesting that some action be performed by a user of hybrid device 306 pertaining the requested service, download and update data contained on hybrid device 306 with the collected data 342, invoke an application residing on hybrid device 306 associated with the collected data 342 and/or service, transmit a multimedia message to hybrid device 306, etc. Communication logic 352 may also be used to facilitate further communications with SMS device 302. For example, in response to a query, response or other type of communication received from hybrid device 306, communication logic 352 may interface with SMS dialog manager 324 to thereafter process additional SMS dialog communications with SMS device 302 (e.g., requesting additional information from a user of SMS device 302 pertaining to the updated inventory).

Figure 4:
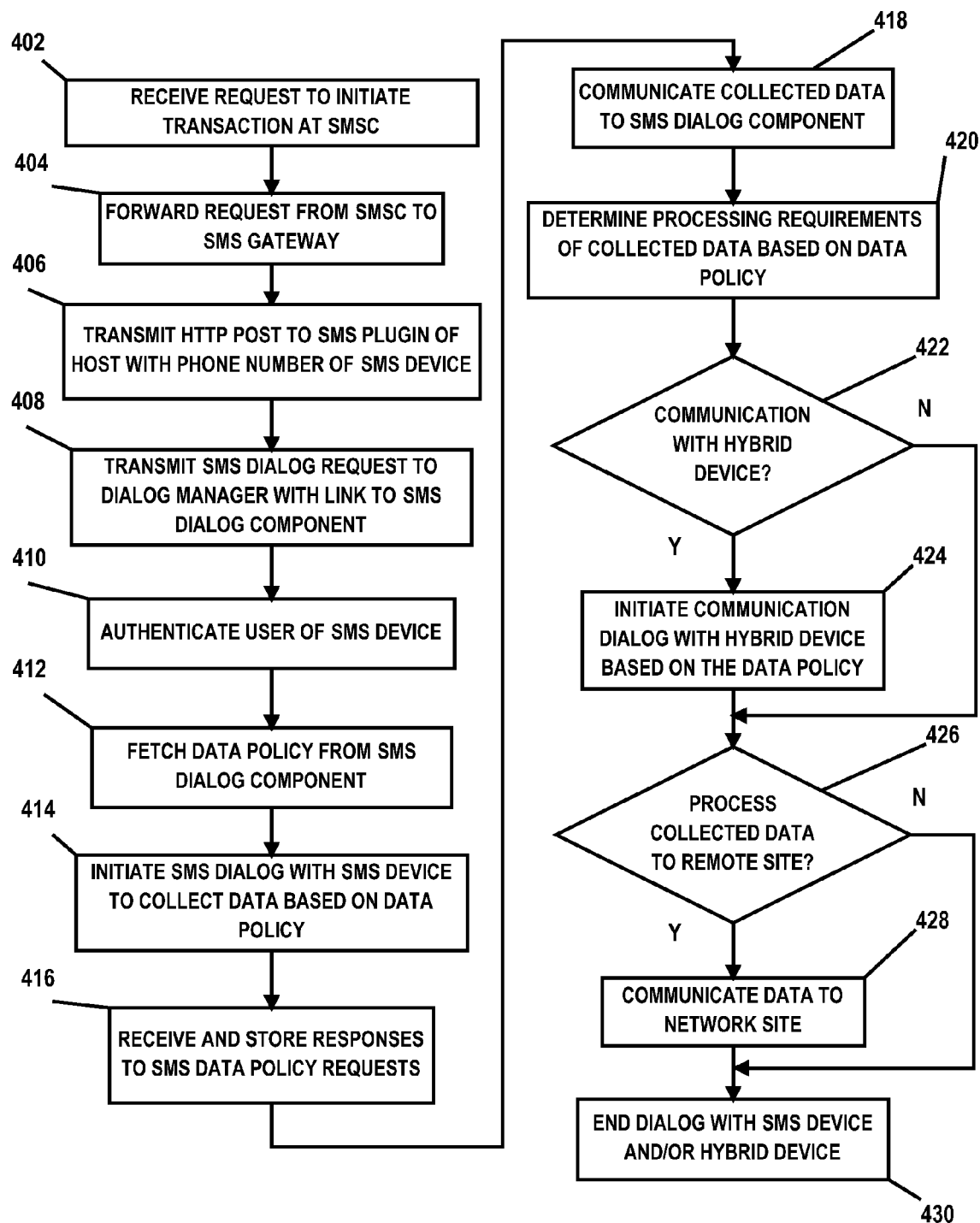
FIG. 4 is a flow diagram illustrating an embodiment of a method for converged dialog in hybrid mobile applications according to the present disclosure.

FIG. 4 is a flow diagram illustrating an embodiment of a method for converged dialog in hybrid mobile applications. The method begins at block 402, where a request to initiate a service on host 306 is received by SMSC 310. The request may be in the form of number, symbol or other message content transmitted to a particular or designated phone number. At block 404, SMSC 310 forwards the request to SMS gateway 312. At block 406, SMS gateway 312 transmits a hypertext transmission protocol (HTTP) or hypertext transmission protocol secure (HTTPS) post to SMS plugin 322 with the designated phone number. At block 408, SMS plugin 322 invokes SMS dialog manager 324 with a link to SMS dialog component 326 based on the requested service. For example, the designated phone number may correlate to a particular service and, correspondingly, particular data policy 334 for the requested service.

At block 410, SMS dialog manager 324 initiates one or more SMS dialog communication messages with SMS device 302 to authenticate a user of SMS device 302. At block 412, SMS dialog manager 324 interfaces with and/or otherwise fetches from SMS dialog component 326 the corresponding data policy 334 for the requested service. At block 414, SMS dialog manager 324 initiates a series of SMS dialog communications with SMS device 302 to collect information based on the particular data policy 334. At block 416, SMS dialog manager 324 receives SMS responses to the SMS requests and stores the collected data 342. At block 418, SMS dialog manager 324 communicates the collected data 342 to SMS dialog component 326. At block 420, SMS dialog component 326 determines and/or otherwise identifies additional processing functions that are to be carried out for the collected data 342. At decisional block 422, a determination is made whether the additional processing functions include communicating with hybrid device 306. If not, the method proceeds to decisional block 426. If it is determined at decisional block 422 that communications with hybrid device 306 are needed, the method proceeds to block 424, where SMS dialog component 326 initiates, for example, non-SMS dialog communications with hybrid device 306. At decisional block 426, a determination is made whether the collected and/or processed data 342 is to be sent to a remote and/or network server 360. If not, the method proceeds to block 430. If it is determined at decisional block 426 that the collected and/or processed data 342 is to be sent to a remote and/or network server 360, the method proceeds to block 428, where SMS dialog component 326 forwards the collected and/or processed data 342 to a remote and/or network server 360. At block 430, if no further communications are needed with SMS device 302 and/or hybrid device 306, communications with SMS device 302 and/or hybrid device 306 are terminated.

Thus, embodiments of the present disclosure enable the management of workflow operations utilizing different types of dialogs between hybrid and non-hybrid mobile devices/applications. For example, in some embodiments, the present disclosure enables workflow data management and acquisition utilizing SMS messages from SMS-type or SMS-limited devices while also enabling the interaction of hybrid devices in the workflow process. Embodiments of the present disclosure enable the use of SMS messages to collect various types of information corresponding to a particular workflow application while also enabling the interaction of hybrid devices in such workflow application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
responsive to receiving a short message service (SMS) request from an SMS device at a host server, initiating a SMS communication dialog with the SMS device to collect data to authenticate an identity of a user of the SMS device;
authenticating the identity of the user of the SMS device;
responsive to authenticating the identity of the user of the SMS device, determining a data policy corresponding to the request;
initiating a SMS communication dialog with the SMS device to collect data corresponding to the data policy;
determining whether the data policy indicates a need for a dialog with a hybrid device; and
responsive to determining that the data policy indicates a need for a dialog with a hybrid device, initiating a non-SMS communication dialog with a hybrid device corresponding to the collected data.

2. The method of claim 1, wherein initiating the SMS communication dialog comprises transmitting a series of SMS dialog requests to the SMS device, each SMS dialog request requesting a particular information component corresponding to the data policy.

3. The method of claim 2, further comprising, responsive to each SMS dialog request, receiving and storing an SMS dialog response including data corresponding to a respective information component of the data policy.

4. The method of claim 1, further comprising:
processing the collected data based on application logic; and
communicating the processed data to the hybrid device via the non-SMS communication dialog.

5. The method of claim 1, further comprising:
processing the collected data based on application logic; and
communicating the processed data to a network server.

6. The method of claim 1, further comprising:
responsive to receiving a query from the hybrid device based on the non-SMS communication dialog with the hybrid device, generating an SMS query message based on the query; and
communicating the SMS query message to the SMS device.

7. A method, comprising:
responsive to receiving a short message service (SMS) request from an SMS device at a host server, initiating a SMS communication dialog with the SMS device to collect data to authenticate an identity of a user of the SMS device;
authenticating the identity of the user of the SMS device;
responsive to authenticating the identity of the user of the SMS device, determining a data policy corresponding to the request;
initiating a SMS communication dialog with the SMS device to collect data corresponding to the data policy;
determining whether the data policy indicates a need for a dialog with a hybrid device; and
responsive to determining that the data policy indicates a need for a dialog with a hybrid device, initiating a non-SMS communication dialog with a hybrid device corresponding to the collected data, the non-SMS communication dialog comprising a non-SMS message invoking an application residing on the hybrid device associated with the data collected from the SMS device.

8. The method of claim 7, further comprising, responsive to receiving the SMS request from the SMS device, authenticating an identity of a user of the SMS device.

9. The method of claim 7, wherein initiating the SMS communication dialog comprises transmitting a series of SMS dialog requests to the SMS device, each SMS dialog request requesting a particular information component corresponding to the data policy.

10. The method of claim 9, further comprising, responsive to each SMS dialog request, receiving and storing an SMS dialog response including data corresponding to a respective information component of the data policy.

11. The method of claim 7, further comprising:
processing the collected data based on application logic; and
communicating the processed data to the hybrid device via the non-SMS communication dialog.

12. The method of claim 7, further comprising:
processing the collected data based on application logic; and
communicating the processed data to a network server.

13. The method of claim 7, further comprising:
responsive to receiving a query from the hybrid device based on the non-SMS communication dialog with the hybrid device, generating an SMS query message based on the query; and
communicating the SMS query message to the SMS device.

* * * * *